Dec. 27, 1949  J. E. BECKER  2,492,456
FLUID CIRCULATION CONTROL FOR
REVERSIBLE FLUID COUPLINGS

Filed Sept. 23, 1948  3 Sheets-Sheet 1

Inventor
JOHN E. BECKER
By
Attorney

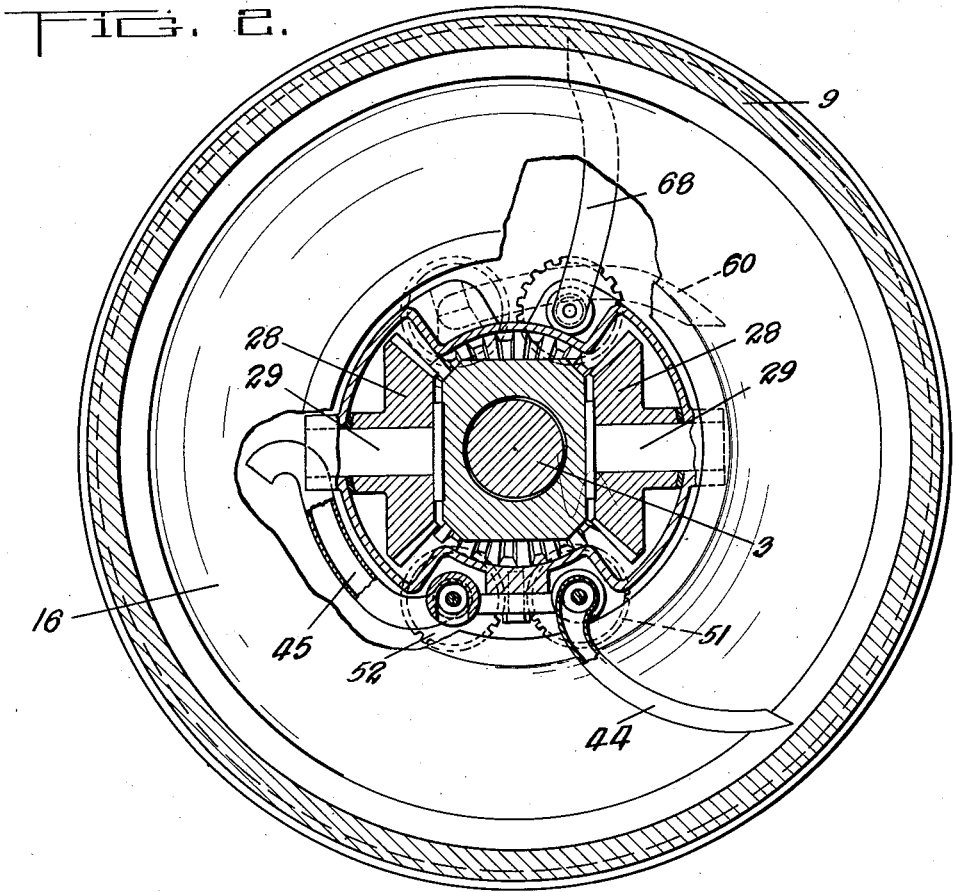
Fig. 2.
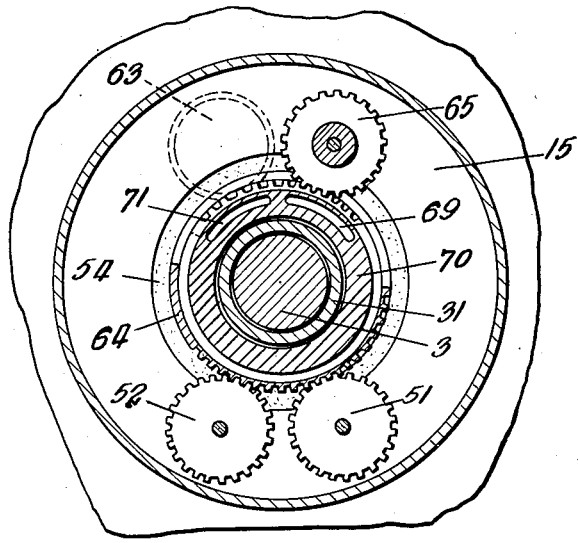
Fig. 3.
Inventor
JOHN E. BECKER
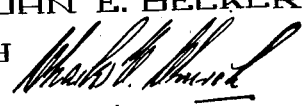
Attorney

Inventor
JOHN E. BECKER
By
Attorney

Patented Dec. 27, 1949

2,492,456

UNITED STATES PATENT OFFICE 2,492,456

FLUID CIRCULATION CONTROL FOR REVERSIBLE FLUID COUPLINGS

John Edward Becker, Darlington, Ontario, Canada

Application September 23, 1948, Serial No. 50,793

11 Claims. (Cl. 74—732)

My invention relates to fluid circulation controls for reversible fluid couplings and the object of the invention is to provide a construction consisting of a pair of gear connected fluid couplings designed to rotate in opposite directions to each other, each coupling being fed from a fluid reservoir of cylindrical form and rotatable with the reversible coupling assembly.

A further and important object of the invention is to furnish a plurality of scoop pipes which are swingable into and out of the centrifugal fluid rings formed in the couplings and in the rotatable reservoir, the actuation of such scoops enabling fluid to be removed from either of the couplings or from the reservoir in the manipulation of the reversible coupling mechanism.

Another feature of the invention is to construct the clutch mechanism with two pairs of scoop pipes which are so arranged that one scoop pipe of each pair is contained within a fluid chamber forming part of a coupling assembly, and the other scoop pipe of each pair contained within the rotatable reservoir.

With the foregoing and other objects in view as shall hereinafter appear, my invention consists of a fluid circulation control for reversible fluid couplings constructed and arranged all as hereinafter more particularly described and illustrated in the accompanying drawings in which:

Fig. 2 is a transverse cross-sectional view taken through the staggered line 2—2, Fig. 1.

Fig. 3 is a transverse cross-section taken through the line 3—3, Fig. 1.

Like characters of reference indicate corresponding parts in the different views of the drawings.

Figure 1:
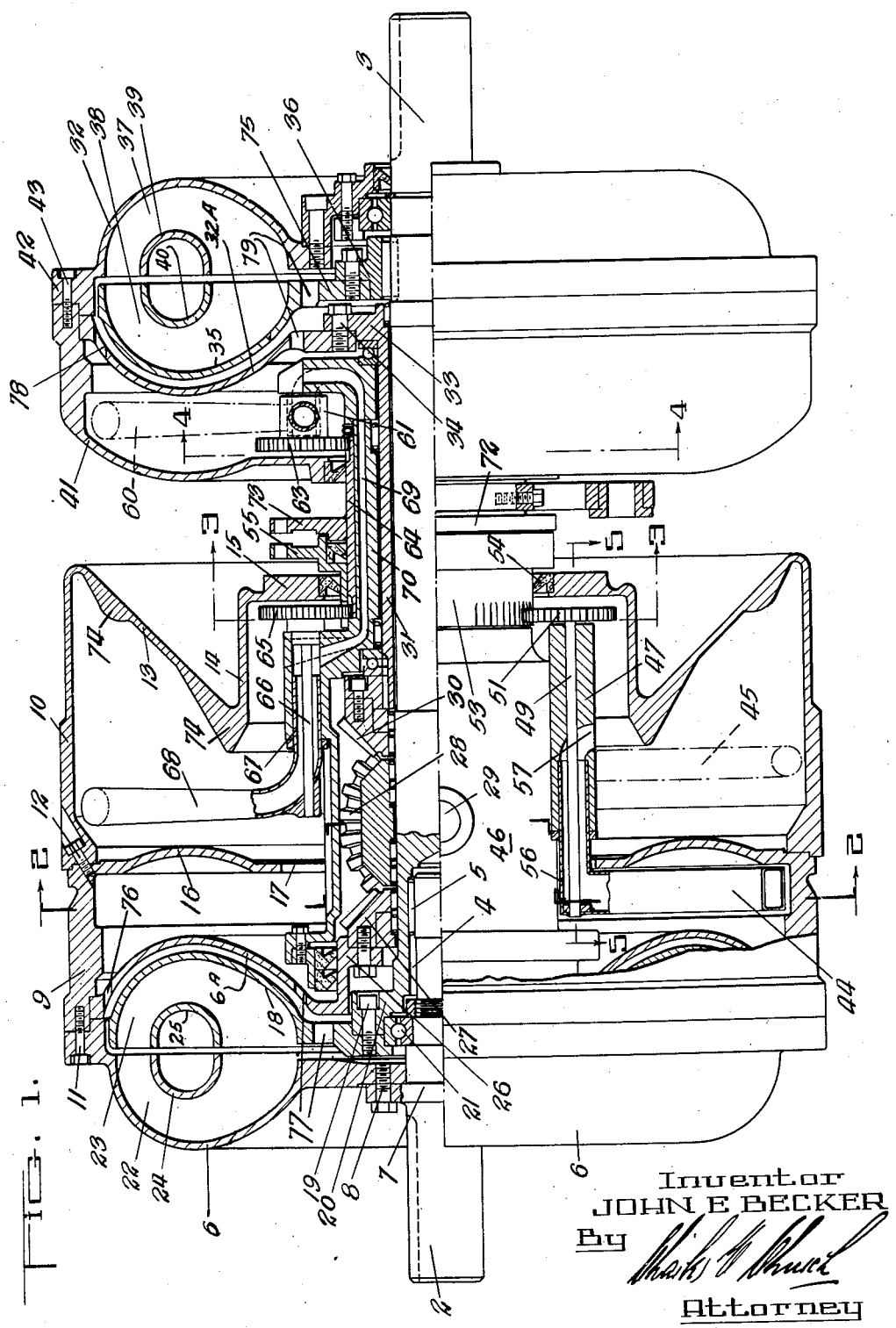
Fig. 1 is a longitudinal cross-sectional view through the coupling assembly, the upper half being shown in complete cross-section and the lower half in partial cross-section.

The complete coupling assembly incorporating the two fluid couplings and the reservoir therebetween is designed to rotate as a unit, being carried by a driving shaft 2 and a driven shaft 3. The driven shaft 3 extends through the major part of the length of the coupling assembly and has its inner end formed with a bore 4 in which the reduced inner end of the driving shaft 2 is mounted within needle bearings 5 contained within the bore 4.

The driving shaft 2 carries an impeller housing 6 of orbicular form which is secured to a flange 7 on the shaft 2 by a series of studs 8. The impeller housing 6 is connected at its periphery to a shell forming a fluid chamber 9 which is in turn connected to a rotatable reservoir 10. The shell 9 is secured to the impeller housing by a plurality of studs 11, provided to extend through orifices in the impeller housing and being threaded into the shell 9 whereby the shell is drawn into fluid-tight engagement with the impeller. The reservoir 10 is similarly secured to the shell 9 by a plurality of studs 12.

The end wall 13 of the reservoir 10 is of conical form and is connected at its centre to a cylindrical portion 14 of the reservoir which is of reduced diameter and formed with an end wall 15 having a central orifice through which the driven shaft and sleeve assembly extends, as shall be hereinafter described. The chamber 9 is divided from the reservoir 10 by a partition wall 16 integrally formed at its periphery with the peripheral wall of the shell 9. The partition wall 16 is formed with a central orifice 17 within which the driving gear assembly is contained.

The impeller housing 6 encases a runner housing 18 secured by studs 19 to a flange 20 formed upon the inner end of the driven shaft 3. The portion of the driven shaft carrying the flange 20 is mounted upon a ball bearing 21 seated upon the driving shaft 2. The impeller housing 6 carries a plurality of suitable radial impeller vanes 22 and the runner housing 18 a plurality of suitable runner vanes 23, the vanes supporting the usual ring members 24 and 25 so that passages for the fluid transmission of power are formed.

The inner wall 6A of the impeller housing carries a central flange 26 which supports a bevel ring gear 27 concentrically positioned to the driven shaft 3. The ring gear 27 meshes with a pair of bevel gears 28 carried upon stub shafts 29 and which in turn mesh with a second bevel gear 30 mounted upon a sleeve 31 surrounding the driven shaft 3 and connected to an orbicular impeller housing 32 of the second coupling. The sleeve 31 is formed with a flange 33 through which studs 34 extend into the central portion of the inner wall 32A of the impeller housing 32.

The impeller housing 32 contains a runner housing 35, the central flange 75 of which is attached to a hub 36 keyed to the driven shaft 3, whereby the driven shaft 3 and runner housing 35 rotate in unison. The impeller housing 32 contains a plurality of suitably positioned radial impeller blades 37, and the runner housing 35 a plurality of suitable radially positioned runner blades 38; the blades support the usual ring members 39 and 40 whereby passages for the fluid transmission of power are formed. A fluid chamber 41 is secured to a peripheral flange 42 on the impeller housing 32 by a plurality of studs 43 which draw the two parts into a fluid-tight connection.

From the foregoing description it will be apparent that the driving shaft 2, impeller housing 6, chamber 9, reservoir 10, ring gear 27, bevel gears 28, ring gear 30, sleeve 31, second impeller housing 32 and fluid chamber 41 will rotate in unison. Through the provision of the bevel gears 27, 28, and 30 interposed between the two impeller housings, the impeller housing 32 with its chamber 41 will rotate in the opposite direction to the driving shaft 2 and impeller housing 6. When fluid is contained within the impeller housing 6 the runner housing 18 will rotate therewith in the same direction and also rotate the driven shaft 3, to which it is connected, in the same direction. Upon fluid being removed from the impeller housing 6 and injected into the second impeller housing 32, which rotates in the opposite direction to the impeller housing 6, the runner housing 35 will rotate in unison with the impeller housing 32 and as it is connected to the driven shaft 3 will rotate the driven shaft 3 in the opposite direction to the direction of rotation of the driving shaft 2.

Figure 5:
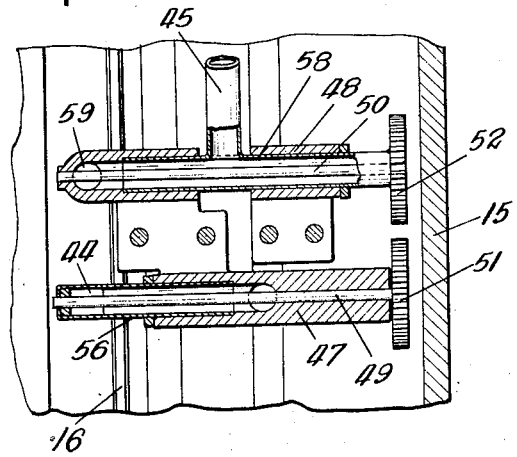
Fig. 5 is a longitudinal cross-section through a fragmentary portion of the coupling, being taken through the line 5—5, Fig. 1.

To remove fluid from the impeller housing 6 and chamber 9 and also to inject fluid thereinto from the reservoir 10, a pair of scoop pipes 44 and 45 are furnished. The scoop pipe 44 is contained within the fluid chamber 9 and the scoop pipe 45 contained within the reservoir 10. The scoop pipes are swingably mounted to be swung into and out of the centrifugal fluid rings in the chamber 9 and reservoir 10. The mechanism to accomplish these movements in unison is shown in detail in Figs. 3 and 5. A cylindrical housing 46 surrounds the bevel gear assembly and forms the inner peripheral wall of the reservoir 10. The wall 46 carries a mounting for a pair of scoop pipe tube supporting members 47 and 48. The member 47 has a spindle 49 extending through its bore and the member 48 a spindle 50 extending through its bore. The spindles 49 and 50 carry gear wheels 51 and 52 which mesh with teeth cut within the lower half of a ring 53 positioned within the orifice in the flange 15 and retained in fluid-tight connection therewith by a seal ring 54. The ring 53 is formed with a radially projecting lug 55 adapted to be connected to a suitably positioned operating lever, which is not shown. It will be appreciated that as the ring 53 is partly rotated through the medium of a manual lever connected to the lug 55 that such movement will partly rotate the gears 51 and 52 with their spindles 49 and 50. The spindle 49 extends along the tube 56 which is rotatably mounted within the bore of the member 47 and to which the scoop pipe 44 is attached. The assembly is such that the partly rotative movement of the spindle 49 will swing the scoop pipe 44 either into or out of the fluid ring in the chamber 9. In order that fluid scooped from the chamber 9 through the scoop pipe 44 may pass into the reservoir 10, a fluid injection port 57 is formed within the member 47 and communicates with the tube 56.

The spindle 50 of the gear 52 is contained within a sleeve 58 rotatably positioned within the bore of the member 48 and from the central portion of which the scoop pipe 45 projects. The sleeve 58 is secured to the gear 52 so that it rotates therewith and swings the scoop pipe 45. In order that fluid taken out of the reservoir 10 by the scoop pipe 45 may pass into the fluid chamber 9 the member 48 containing the sleeve 58 projects through the central orifice 17 in the wall 16 of the chamber 9 and is formed with a fluid ejection orifice 59 in its end. The scoop pipes 44 and 45 are so positioned in relation to the meshing of the gears 51 and 52 with the teeth on the ring 53, that rotative movement of the ring 53 causes one scoop pipe to swing out of its fluid ring as the other scoop pipe enters its fluid ring, and vice versa.

Figure 4:
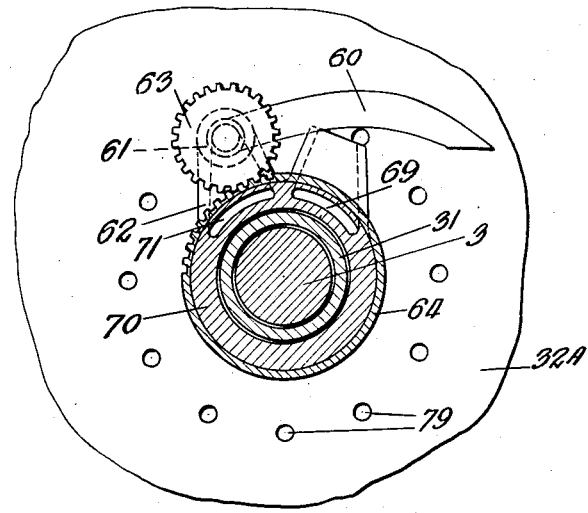
Fig. 4 is a transverse cross-section taken through the line 4—4, Fig. 1.

To remove fluid from the chamber 41 of the impeller housing 32 a scoop pipe 60 is contained within the chamber. This scoop pipe projects from a swingable hub 61 pivotly mounted upon a bracket 62 and carrying a gear wheel 63 which meshes with teeth upon the end of a sleeve 64 which surrounds the driven shaft 3 and extends into the reservoir 10. The end of the sleeve 64 in the reservoir 10 is also formed with teeth which mesh with a gear 65 having its hub contained within the end of a bore formed within the inner peripheral wall 46 of the reservoir. The gear 65 is carried by a spindle 66 which extends centrally through a rotatable sleeve 67 carrying the scoop pipe 68. Movement of the gear 65 swings the scoop pipe 68 into and out of the centrifugal fluid ring in the reservoir 10. A passageway 69 forms a communication between the sleeve 67 and the chamber 41, being contained within a hub 70 upon which the toothed sleeve 64 is carried. The passageway 69 opens into the chamber 41 adjacent to the scoop pipe 60, and a second passageway 71 communicates with and extends from the swingable hub 61 and is contained within the hub 70 to open into the reservoir 10 adjacent to the mounting of the scoop pipe 68. See Fig. 4.

To rotate the toothed sleeve 64 in order to move the gears 63 and 65 a ring 72 is secured to the sleeve and formed with a lug 73 which is attached to a suitable hand lever, not shown, so the movement of the lever partly rotates the ring 72 and sleeve 64 to obtain part rotation of the gears 63 and 65 and the scoop pipes 60 and 68. The scoop pipes 60 and 68 are so positioned in relation to the gears 63 and 65 that movement of the meshing sleeve 64 causes one scoop pipe to enter its centrifugal fluid ring as the other scoop pipe leaves its centrifugal fluid ring, and vice versa.

The end wall of the reservoir 10 is made of frustoconical form to provide a volumetric fluid capacity which is in proportion to the fluid volume requirements of the two fluid couplings and their fluid chambers. It will be appreciated that it is always necessary to have a sufficient depth of centrifugal fluid ring contained within the reservoir 10 to achieve rapid filling of either of the fluid couplings, and it is for this reason that the reservoir 10 is made of the particular shape as shown in Fig. 1, wherein the end wall 13 is formed with raised portions 74 which produce certain predetermined centrifugal fluid ring depths with certain predetermined volumes of fluid.

The operation of the clutch mechanism is extremely simple. If the clutch is operating under direct drive, fluid is contained within the impeller housing 6 and also within the chamber 9 which communicates therewith through the orifices 76.

When running in full capacity direct drive, the scoop pipe 44 is swung upwardly out of the centrifugal fluid ring in the chamber 9 and the scoop pipe 45 is in the extended position in the reservoir 10 which is empty of fluid. If it is desired to slow down the output speed of the driven shaft 3 in relation to the speed of the driving shaft 2, the ring 53 is partly rotated to partly rotate the gears 51 and 52 with the resultant movement of the scoop pipe 44 towards and into the fluid ring in the chamber 9 and the outward movement of the scoop pipe 45 away from the peripheral wall of the reservoir 10. This action causes fluid to be scooped by the pipe 44 and passed into the reservoir 10 through the port 57, and under certain adjustments the proportion of fluid in the reservoir 10 may be ejected through the scoop pipe 45 and returned to the chamber 9 through the orifice 59. If it is desired to completely remove the fluid from the impeller housing 6, the scoop pipe 44 is immersed to the fullest extent in the fluid ring in the chamber 9 which will transfer all the fluid from the impeller housing 6 and chamber 9 into the reservoir 10. Air vents 77 are provided in the central portions of the wall 6A of the housing 6 and the runner housing 18. During the forward driving operation as has been just described, the scoop pipe 68 will be in the downwardly swung position away from the fluid ring in the reservoir 10 and the scoop pipe 60 in the chamber 41 will be in the fully extended position, at which time the chamber 41 is empty of fluid.

To rotate the driven shaft 3 in the opposite direction to the driving shaft 2, the fluid is removed from the impeller housing 6 and shell 9 and transferred to the reservoir 10. This fluid removal is accomplished by partly rotating the ring 53, which movement through the medium of the gears 51 and 52 will cause the scoop pipe 44 to swing outwardly into the centrifugal fluid ring in the shell 9 and the scoop pipe 45 to swing inwardly from out of the fluid ring space in the reservoir 10. The fluid transfer allows the driven shaft 3 to come to a standstill. The ring 72 is then partly rotated to partly rotate the sleeve 64, the teeth of which sleeve mesh with the gears 63 and 65. The part rotation of the gears 63 and 65 causes the scoop pipe 68 to swing into the centrifugal fluid ring in the reservoir 10, and the scoop pipe 60 to swing inwardly from out of the fluid ring space in the chamber 41.

Immediately the scoop pipe 68 enters the fluid ring in the reservoir 10, fluid will be transferred from the reservoir through the scoop pipe and passageway 69 into the chamber 41 and through the orifices 78 into the impeller housing 32, which is rotating in the opposite direction to the driving shaft 2. The entrance of fluid into the impeller housing 32 causes the runner housing 35 to rotate with the impeller housing 32, and as the runner housing is attached to the driven shaft 3, the driven shaft will rotate in the opposite direction to the driving shaft 2.

The speed of the reverse running driven shaft 3 in relation to the speed of the driving shaft 2, is governed by manipulation of the ring 72 whereby the scoop pipes 60 and 68 may be variably adjusted to produce a continuous flow of fluid between the reservoir 10 and the chamber 41. Air vents 79 are formed in the central portions of the wall 32A of the impeller housing 32 and the runner housing 35. To evacuate the fluid from the impeller housing 32, the ring 72 is rotated to completely swing the scoop pipe 60 outwardly into the centrifugal fluid ring in the chamber 41 and the scoop pipe 68 inwardly from out of the fluid ring space in the reservoir 10, under which movement the driven shaft 3 will come to a standstill.

From the foregoing description it will be appreciated that by my construction an infinite number of driven shaft speeds may be obtained either in forward drive or reverse, it being only necessary to manipulate the pairs of scoop pipes to instantly produce the desired result.

What I claim as my invention is:

1. In a reversible fluid clutch, a driving shaft, a driven shaft in alignment with the driving shaft, a rotatable impeller member secured to the driving shaft and containing a plurality of radial impeller blades, a rotatable runner member secured to the driven shaft and containing a plurality of radial blades and adapted to be driven by the impeller member through the medium of a fluid, a second impeller member containing a plurality of radial impeller blades, a gear connection extending between the first impeller member and the second impeller member and so arranged that the second impeller member rotates in the opposite direction to the first impeller member, a second rotatable runner member secured to the driven shaft and containing a plurality of radial blades and adapted to be driven by the second impeller member through the medium of a fluid, a fluid reservoir rotatable with the clutch and concentric with the driving and driven shafts, a pair of swingably mounted fluid ejection scoop pipes for removing fluid from the centrifugal fluid rings in the two impeller members and in fluid communication with the rotatable fluid reservoir, and a pair of swingably mounted fluid ejection scoop pipes contained within the rotatable fluid reservoir for removing fluid from its centrifugal fluid ring and in communication with the impeller members.

2. A reversible fluid clutch as claimed in claim 1, wherein each swingable fluid ejection impeller scoop pipe swings in unison with one of the fluid reservoir scoop pipes, the movement of an impeller scoop pipe towards its centrifugal fluid ring being accompanied by a movement of a fluid reservoir scoop pipe away from its centrifugal fluid ring and vice versa.

3. A reversible fluid clutch as claimed in claim 1, wherein each swingable fluid ejection impeller scoop pipe swings in unison with one of the fluid reservoir scoop pipes, a pair of manually rotatable gears, a pair of gear wheels meshing with each manually rotatable gear, one gear of each pair being coupled to an impeller scoop pipe which swings with the movement of its gear, the other gear of each pair being coupled to a fluid reservoir scoop pipe which swings with the movement of its gear, the movement of an impeller scoop pipe towards its centrifugal fluid ring being accompanied by a movement of a fluid reservoir scoop pipe away from its centrifugal fluid ring and vice versa.

4. A reversible fluid clutch as claimed in claim 1, wherein each swingable fluid ejection impeller scoop pipe swings in unison with one of the fluid reservoir scoop pipes, a pair of manually rotatable ring gears concentric with the driven shaft, a pair of gear wheels meshing with each manually rotatable ring gear, one gear of each pair being coupled to an impeller scoop pipe which swings with the movement of its gear, the other gear of each pair being coupled to a fluid reservoir scoop pipe which swings with the movement of its gear, the movement of an impeller scoop pipe towards its centrifugal fluid ring being accompanied by a movement of a fluid reservoir scoop pipe away from its centrifugal fluid ring and vice versa.

5. A reversible fluid clutch as claimed in claim 1, wherein each impeller member is in fluid communication with a fluid chamber rotatable therewith, and wherein the fluid ejection scoop pipes for removing fluid from the impeller members are contained within the fluid chambers.

6. A reversible fluid clutch as claimed in claim 1, wherein each impeller member is in fluid communication with a fluid chamber rotatable therewith, the fluid ejection scoop pipes for removing fluid from the impeller members being contained within the fluid chambers, and wherein each impeller fluid ejection scoop pipe swings in unison with one of the fluid reservoir scoop pipes, the movement of an impeller fluid ejection scoop pipe towards its centrifugal fluid ring being accompanied by a movement of a fluid reservoir scoop pipe away from its centrifugal fluid ring and vice versa.

7. A reversible fluid clutch as claimed in claim 1, wherein each impeller member is in fluid communication with a fluid chamber rotatable therewith, the fluid ejection scoop pipes for removing fluid from the impeller members being contained within the fluid chambers, and wherein each swingable fluid ejection impeller scoop pipe swings in unison with one of the fluid reservoir scoop pipes, a pair of manually rotatable gears, a pair of gear wheels meshing with each manually rotatable gear, one gear of each pair being coupled to an impeller scoop pipe which swings with the movement of its gear, the other gear of each pair being coupled to a fluid reservoir scoop pipe which swings with the movement of its gear, the movement of an impeller scoop pipe towards its centrifugal fluid ring being accompanied by a movement of a fluid reservoir scoop pipe away from its centrifugal fluid ring and vice versa.

8. A reversible fluid clutch as claimed in claim 1, wherein each impeller member is in fluid communication with a fluid chamber rotatable therewith, the fluid ejection scoop pipes for removing fluid from the impeller members being contained within the fluid chambers, and wherein each swingable fluid ejection impeller scoop pipe swings in unison with one of the fluid reservoir scoop pipes, a pair of manually rotatable ring gears concentric with the driven shaft, a pair of gear wheels meshing with each manually rotatable gear, one gear of each pair being coupled to an impeller scoop pipe which swings with the movement of its gear, the other gear of each pair being coupled to a fluid reservoir scoop pipe which swings with the movement of its gear, the movement of an impeller scoop pipe towards its centrifugal fluid ring being accompanied by a movement of a fluid reservoir scoop pipe away from its centrifugal fluid ring and vice versa.

9. In a reversible fluid clutch, a driving shaft, a driven shaft in alignment with the driving shaft, a rotatable impeller member secured to the driving shaft and containing a plurality of radial impeller blades, a rotatable runner member secured to the driven shaft and containing a plurality of radial blades and adapted to be driven by the impeller member through the medium of a fluid, a second impeller member containing a plurality of radial impeller blades, a gear connection extending between the first impeller member and the second impeller member and so arranged that the second impeller member rotates in the opposite direction to the first impeller member, a second rotatable runner member secured to the driven shaft and containing a plurality of radial blades and adapted to be driven by the second impeller member through the medium of a fluid, a fluid reservoir attached to the driving shaft impeller member and rotatable therewith, a pair of swingably mounted fluid ejection scoop pipes for removing fluid from the centrifugal fluid rings in the two impeller members and in fluid communication with the rotatable fluid reservoir, and a pair of swingably mounted fluid ejection scoop pipes contained within the rotatable fluid reservoir for removing fluid from its centrifugal fluid ring and in communication with the impeller members.

10. A reversible fluid clutch as claimed in claim 9, wherein each swingable fluid ejection impeller scoop pipe swings in unison with one of the fluid reservoir scoop pipes, a pair of manually rotatable ring gears concentric with the driven shaft and contained within the fluid reservoir, a pair of gear wheels meshing with each manually rotatable ring gear, one gear of each pair being coupled to an impeller scoop pipe which swings with the movement of its gear, and the other gear of each pair being coupled to a fluid reservoir scoop pipe which swings with the movement of its gear, the movement of an impeller scoop pipe towards its centrifugal fluid ring being accompanied by a movement of a fluid reservoir scoop pipe away from its centrifugal fluid ring and vice versa.

11. A reversible fluid clutch as claimed in claim 9, wherein each swingable fluid ejection impeller scoop pipe swings in unison with one of the fluid reservoir scoop pipes, a pair of manually rotatable ring gears concentric with the driven shaft and contained within the fluid reservoir, a pair of gear wheels meshing with each manually rotatable ring gear, one gear of each pair being coupled to an impeller scoop pipe which swings with the movement of its gear, and the other gear of each pair being coupled to a fluid reservoir scoop pipe which swings with the movement of its gear, the movement of an impeller scoop pipe towards its centrifugal fluid ring being accompanied by a movement of a fluid reservoir scoop pipe away from its centrifugal fluid ring and vice versa, and wherein each impeller member is in fluid communication with a fluid chamber rotatable therewith, the fluid ejection scoop pipes for removing fluid from the impeller members being contained within the fluid chambers.

JOHN EDWARD BECKER.

REFERENCES CITED

The following references are of record in the file of this patent:

UNITED STATES PATENTS

| Number | Name | Date |
|---|---|---|
| 1,757,827 | Bauer | May 6, 1930 |
| 1,987,985 | Bauer | Jan. 15, 1935 |
| 2,029,981 | Black | Feb. 4, 1936 |
| 2,284,362 | Birmann | May 26, 1942 |
| 2,301,294 | Kuhns et al. | Nov. 10, 1942 |
| 2,423,820 | Baumann | July 15, 1947 |